(12) United States Patent
Onuma (10) Patent No.: US 11,608,072 B2
(45) Date of Patent: Mar. 21, 2023

(54) ON-BOARD DEVICE, CONTROL METHOD OF ON-BOARD DEVICE, NON-TRANSITORY STORAGE MEDIUM STORING PROGRAM, AND SURFACE TEMPERATURE ADJUSTING METHOD OF VEHICULAR SEAT

(71) Applicant: Toyota Jidosha Kabushiki Kaisha, Toyota (JP)

(72) Inventor: Masahiko Onuma, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 732 days.

(21) Appl. No.: 16/453,243

(22) Filed: Jun. 26, 2019

(65) Prior Publication Data

US 2020/0062271 A1 Feb. 27, 2020

(30) Foreign Application Priority Data

Aug. 23, 2018 (JP) .............................. JP2018-156063

(51) Int. Cl.
*B60W 50/00* (2006.01)
*B60H 1/00* (2006.01)
(Continued)

(52) U.S. Cl.
CPC ..... *B60W 50/0098* (2013.01); *B60H 1/00735* (2013.01); *B60H 1/00964* (2013.01);
(Continued)

(58) Field of Classification Search
CPC combination set(s) only.
See application file for complete search history.

(56) References Cited

U.S. PATENT DOCUMENTS

| 10,214,118 B1* | 2/2019 | Jain ........................ B60K 35/00 |
| 2012/0029729 A1* | 2/2012 | Weslati .............. G07C 9/00817 |
| | | 701/2 |

(Continued)

FOREIGN PATENT DOCUMENTS

| CN | 106541866 A | 3/2017 |
| JP | 2007-015504 A | 1/2007 |

(Continued)

OTHER PUBLICATIONS

Nissan USA, "2014 Altima Sedan Owner's Manual", Jun. 2013 (Year: 2013).*

*Primary Examiner* — James M McPherson
*Assistant Examiner* — Kyle J Kingsland
(74) *Attorney, Agent, or Firm* — Dinsmore & Shohl LLP (57) ABSTRACT

An on-board device includes: an air-conditioning unit configured to perform air conditioning by blowing air-conditioning air into a vehicle cabin from an at outlet port that faces the vehicle cabin, and perform, in accordance with remote control, pre-air conditioning for air-conditioning the vehicle cabin before an occupant gets into a vehicle; a seat moving unit configured to move a vehicular seat in a seat front-rear direction, the vehicular seat being disposed such that a front face of a seat back faces the air outlet port; and a control unit configured to, when the remote control is perforated for performing the pre-air conditioning, control the air-conditioning unit such that the pre-air conditioning is performed, and control the seat moving unit such that the vehicular seat moves to a seat front side.

11 Claims, 5 Drawing Sheets

(51) Int. Cl.
  B60N 2/02 (2006.01)
  B60N 2/20 (2006.01)
  B60N 2/56 (2006.01)
(52) U.S. Cl.
  CPC ............ B60N 2/0244 (2013.01); B60N 2/20 (2013.01); B60N 2/56 (2013.01)

(56) References Cited

U.S. PATENT DOCUMENTS

| | | |
|---|---|---|
| 2015/0097041 A1 | 4/2015 | Hirabayashi et al. |
| 2017/0080837 A1 | 3/2017 | Cho et al. |
| 2017/0327125 A1 | 11/2017 | Nordbruch |
| 2020/0317020 A1* | 10/2020 | Maeda .................... B60H 1/34 |

FOREIGN PATENT DOCUMENTS

| | | |
|---|---|---|
| JP | 2013-193681 A | 9/2013 |
| JP | 2013-212809 A | 10/2013 |
| JP | 2013-226858 A | 11/2013 |

* cited by examiner

ON-BOARD DEVICE, CONTROL METHOD OF ON-BOARD DEVICE, NON-TRANSITORY STORAGE MEDIUM STORING PROGRAM, AND SURFACE TEMPERATURE ADJUSTING METHOD OF VEHICULAR SEAT

CROSS-REFERENCE TO RELATED APPLICATION

This application claims priority to Japanese Patent Application No. 2018-156063 filed on Aug. 23, 2018, which is incorporated herein by reference in its entirety.

BACKGROUND

1. Technical Field

The present disclosure relates to an on-board device, a control method of an on-board device, a non-transitory storage medium storing a program, and a surface temperature adjusting method of a vehicular seat.

2. Description of Related Art

A technique for performing pre-air conditioning of a vehicle cabin by remote control is known (see Japanese Patent Application Publication No. 2007-015504, Japanese Patent Application Publication No. 2013-226858, Japanese Patent Application Publication No. 2013-212809, and Japanese Patent Application Publication No. 2013-193681). For example, JP 2007-015504 A discloses a technique that sets a plurality of air conditioning zones in a vehicle cabin such that air conditioning of the respective air conditioning zones is independently controlled and when pre-air conditioning control is requested by remote control, the pre-air conditioning control is carried out only in a preferential zone out of the air conditioning zones.

SUMMARY

However, when the technique is applied, it is conceivable that the temperature of air-conditioning air may change beyond the scope of assumption by the time the air-conditioning air reaches a vehicular seat, depending on a difference in temperature between the air-conditioning air and the vehicle cabin. Accordingly, there is room for improvement in terms of adjusting a surface temperature of the vehicular seat at the time when an occupant sits on the seat to a comfortable temperature.

The present disclosure provides an on-board device, a control method of an on-board device, a non-transitory storage medium storing a program, and a surface temperature adjusting method of a vehicular seat, which can adjust a surface temperature of the vehicular seat at the time when an occupant sits on the seat to a comfortable temperature.

A first aspect of the disclosure provides an on-board device, including: an air-conditioning unit configured to perform air conditioning by blowing air-conditioning air into a vehicle cabin from an air outlet port that faces the vehicle cabin, and perform, in accordance with remote control, pre-air conditioning for air-conditioning the vehicle cabin before an occupant gets into a vehicle; a seat moving unit configured to move a vehicular seat in a seat front-rear direction, the vehicular seat being disposed such that a front face of a seat back faces the air outlet port; and a control unit configured to, when the remote control is performed for performing the pre-air conditioning, control the air-conditioning unit such that the pre-air conditioning is performed, and control the seat moving unit such that the vehicular seat moves to a seat front side. In the first aspect, the control unit may be configured to, when the remote control is performed for performing the pre-air conditioning, control the seat moving unit such that the vehicular seat moves to the seat front side from a position at a time when an occupant most recently got out of the vehicle. The term "position at the time when an occupant most recently got out of a vehicle" may refer to the position where a vehicular seat is positioned when the occupant most recently got out of the vehicle.

According to the configuration, an air-conditioning unit is configured to perform air conditioning by blowing air-conditioning air into a vehicle cabin from an air outlet port that faces the vehicle cabin, and execute pre-air conditioning that air-conditions the vehicle cabin in advance by remote control before an occupant gets into a vehicle. The seat moving unit has a function of moving the vehicular seat in a seat front-rear direction, the vehicular seat being disposed such that a front face of a seat back faces the air outlet port. When the remote control is performed for execution of the pre-air conditioning, the control unit controls the air-conditioning unit such that the pre-air conditioning is executed, and controls the seal moving unit such that the vehicular seat moves to a seat front side. Thus, the vehicular seat is brought close to the air outlet port before the occupant gets into the vehicle, and receives the air-conditioning air supplied by pre-air conditioning. Accordingly, the surface temperature of the vehicular seat at the time when the occupant sits on the seat is adjusted to be close to the temperature of the pre-air conditioning.

In the first aspect, the on-board device may further include a seat back reclining unit configured to recline the seat back in the seat front-rear direction. The control unit may be configured to control the seat back reclining unit such that the seat back is reclined to the seat front side when the remote control is performed for performing the pre-air conditioning.

According to the configuration, when the remote control is performed for performing the pre-air conditioning, the seat back is reclined to the seat front side. Hence, the air-conditioning air is more effectively applied to the front face of the seat back.

In the first aspect, the on-board device may further include a suction unit configured to suck air on a front side of the seat back at least into an inside of the seat back of the vehicular seat. The control unit may be configured to control the suction unit such that the air on the front side of the seal back is sucked at least into the inside of the seat back of the vehicular seat when the remote control is performed for performing the pre-air conditioning.

According to the configuration, when the remote control is performed for performing the pre-air conditioning, the air on the front side of the seat back is sucked at least into the inside of the seat back of the vehicular seat. Hence, the air-conditioning air is more effectively applied to the front face of the seat back.

In the first aspect, the on-board device may include a detection unit configured to detect at least one of a change in state of a door of the vehicle from a closed state to an opened state and a change in state of a door lock of the vehicle from a locked state to an unlocked state. The control unit may be configured to control the seat moving unit such that the vehicular seat moves to a position at which the vehicular seat positioned before the control unit controls the seat moving unit such that the vehicular seat moves to the seat front side when the remote control is performed for performing the pre-air conditioning, in a case where, after the remote control is performed for performing the pre-air conditioning, the vehicular seat has been moved to the seat front side, and the detection unit detects at least one of the change in state of the door of the vehicle from the closed state to the opened state and the change in state of the door lock of the vehicle from the locked state to the unlocked state.

According to the configuration, detection units detect at least one of a change in state of a door of an own vehicle from a closed state to an opened state and a change in state of a door lock of the own vehicle from a locked state to an unlocked state. In the case where, after the remote control is performed for execution of the pre-air conditioning, the vehicular seat is positioned more on the seat front side than the position when the occupant most recently got out of the vehicle, and the detection units detect at least one of the changes, the vehicular seat is moved, in the seat front-rear direction, to a position identical to the position at the time when the occupant most recently got out of the vehicle. Therefore, the occupant can easily climb into the vehicle.

In the first aspect, the on-board may further include a seat back reclining unit configured to recline the seat back in the seat front-rear direction. The control unit may be configured to control the seat back reclining unit such that the seat back is reclined to the seat front side in accordance with remote control different from the remote control for performing the pre-air conditioning.

In the first aspect, the on-board device may include a suction unit configured to suck air on the front side of the seat back at least into an inside of the seat back. The control unit may be configured to control the suction unit such that the air on the front side of the seat back is sucked at least into the inside of the seat back of the vehicular seat based on remote control different from the remote control for performing the pre-air conditioning.

A second aspect of the disclosure provides a control method of an on-board device. The on-board device includes an air-conditioning unit configured to perform air conditioning by blowing air-conditioning air into a vehicle cabin from an air outlet port that faces the vehicle cabin, and perform pre-air conditioning for air-conditioning the vehicle cabin in advance by remote control before an occupant gets into a vehicle, and a seat moving unit configured to move a vehicular seat in a seat front-rear direction, the vehicular seat being disposed such that a front lace of a seat back faces the air outlet port. The control method includes controlling the air-conditioning unit such that the pre-air conditioning is performed, and controlling, the seat moving unit such that the vehicular seat moves to a seat front side when the remote control is performed for performing the pre-air conditioning. According to a second aspect, the surface temperature of the vehicular seat at the time when the occupant sits on the seat can be adjusted to be close to the temperature of the pre-air conditioning.

A third aspect of the disclosure provides a non-transitory storage medium storing a program, where when executed by a computer that is included in an on-board device including: an air-conditioning unit configured to perform air conditioning by blowing air-conditioning air into a vehicle cabin from an air outlet port that faces the vehicle cabin, and perform, in accordance with remote control, pre-air conditioning for air-conditioning the vehicle cabin before an occupant gets into a vehicle; and a seat moving unit to move a vehicular seat in a seat front-rear direction, the vehicular seat being disposed such that a front face of a seat back faces the air outlet port, the program causes the computer to execute a process including controlling the air-conditioning unit such that the pre-air conditioning is performed, and controlling the seat moving unit such that the vehicular seat moves to a seat front side when the remote control is performed for execution of the pre-air conditioning. According to a third aspect, when a computer executes a control program, the computer carries out a control method of an on-board device similar to the on-board device of the second aspect. Hence, the surface temperature of the vehicular seat at the time when the occupant sits on the seats can be adjusted to be close to the temperature of the pre-air conditioning.

A fourth aspect of the disclosure provides a surface temperature adjusting method of a vehicular seat. The surface temperature adjusting method is applied to a vehicle including an air-conditioning unit including an air outlet port facing a vehicle cabin, and a vehicular seat disposed such that a front face of a seat back faces the air outlet port. The surface temperature adjusting method includes: before an occupant gets into a vehicle, performing pre-air conditioning for air-conditioning a vehicle cabin by blowing air-conditioning air into the vehicle cabin from the air outlet port of the air-conditioning unit, and moving the vehicular seat to a seat front side.

According to the configuration, before the occupant gets into the vehicle, the pre-air conditioning that air-conditions the vehicle cabin in advance is executed, and the vehicular seat is moved to the seat front side from the position when the occupant most recently got out of the vehicle. As a result, the vehicular seat approaches the air outlet port. This makes it possible to adjust the surface temperature of the vehicular seat at the time when the occupant sits on the seat to be close to the temperature of the pre-air conditioning.

In the fourth aspect, the surface temperature adjusting method may further include reclining the seat back to the seat front side before the occupant gets into the vehicle. According to the configuration, the seat back is reclined to the seat front side, which achieves more effective application of the air-conditioning air to the front face of the seat back.

In the fourth aspect, the surface temperature adjusting method may further include sucking air on the front side of the seat back at least into an inside of the seat back of the vehicular seat before the occupant gets into the vehicle. According to the configuration, the air-conditioning air is more efficiently applied to at least the surface of the seat back of the vehicular seat.

As described in the foregoing, the aspects of the present disclosure can demonstrate an advantageous effect of achieving adjustment of the surface temperature of the vehicular seat at the time when an occupant sits on the seat to be a comfortable temperature.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
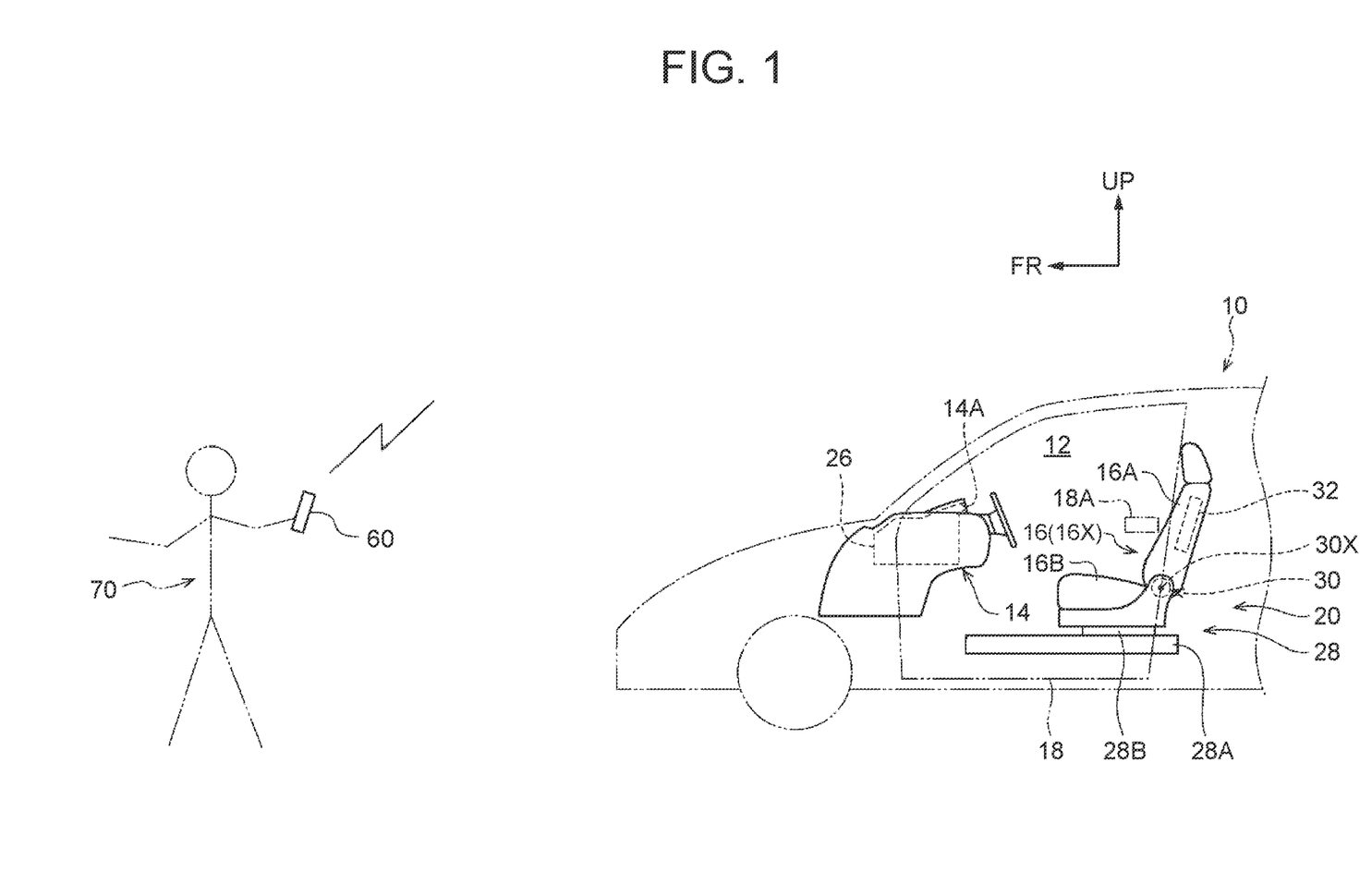
FIG. 1 is a schematic view showing an on-board device in the state of being operated by remote control according to one embodiment of the present disclosure.
Figure 2:
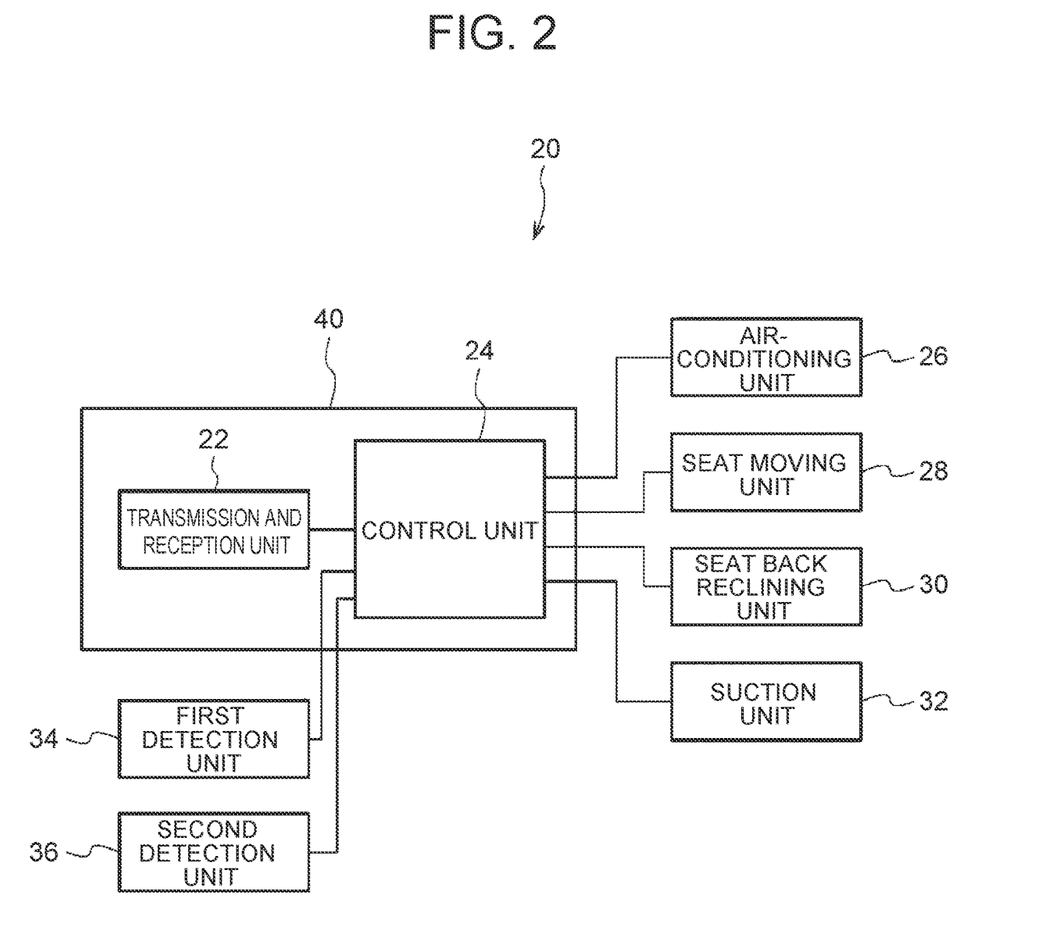
FIG. 2 is a block, diagram showing one example of the schematic configuration of the on-board device according to the embodiment.

An on-board device, a control method of an on-board device, a control program of an on-board device, and a surface temperature adjusting method of an on-board device according to one embodiment of the present disclosure will be described with reference to FIGS. 1 to 5D. FIG. 1 schematically shows an on-board device 20 according to the present embodiment operated by remote control. FIG. 2 a bloc diagram showing one example of the schematic configuration of the on-board device 20 according to the present embodiment. In FIG. 1, arrow FR shows a vehicle front side, and arrow UP shows a vehicle upper side.

As shown in FIG. 1, the on-board device 20 is mounted on a vehicle (automobile) 10. The vehicle 10 is an engine car that uses only an engine as a driving source in one example of the present embodiment. As shown in FIG. 2, the on-board device 20 is configured by including a transmission and reception unit 22, a control unit 24, an air-conditioning unit 26, a seat moving unit 28, a seat back reclining unit 30, a suction unit 32, a first detection unit 34, and a second detection unit 36.

The air-conditioning unit 26 is configured to perform air conditioning by blowing air-conditioning air into a vehicle cabin 12 shown in FIG. 1 from an air outlet port 14A that faces the vehicle cabin 12, and execute pre-air conditioning that air-conditions the vehicle cabin in advance by (in other words, based on or in accordance with) remote control before an occupant gets into the vehicle. The air outlet port 14A is formed on an instrument panel 14 disposed in a front portion of the vehicle cabin 12 in one example. In the vehicle cabin 12, a vehicular seat 16 (front seat in one example) is disposed such that a front face of a seat back 16A is on the side facing the air outlet port 14A.

The transmission and reception unit 22 shown in FIG. 2 receives, from a mobile device 60 possessed by a user 70 who is outside the vehicle cabin 12 of the vehicle 10 shown in FIG. 1, a pre-air conditioning instruction signal that instructs the air-conditioning, unit 26 to execute pre-air conditioning. The transmission and reception unit 22 shown in FIG. 2 also transmits, upon reception of the pre-air conditioning instruction, a signal notifying reception of the pre-air conditioning instruction to the mobile device 60 (see FIG. 1).

The seat moving unit 28, which can move the vehicular seat 16 shown in FIG. 1 in a seat front-rear direction (i.e., slide the seat in the front-rear direction), includes a lower rail 28A, an upper rail 28B, and a driving unit (illustration omitted, a motor in one example). The lower rail 28A is disposed on a vehicle floor side with the seat front-rear direction as a longitudinal direction. The upper rail 28B, which is attached to a lower face side of a seat cushion 16B of the vehicular seat 16, is engaged with the lower rail 28A movably in the seat front-rear direction. The driving unit (illustration omitted) is mounted on the side of the seat cushion 16B of the vehicular seat 16 to move the upper rail 28B in the seat front-rear direction upon operation.

The seat back reclining unit 30, which can recline the seat back 16A of the vehicular seat 16 in the seat front-rear direction (i.e. change a reclining, angle of the seat back 16A in a seat side view), includes a hinge (illustration omitted) and a driving unit (illustration omitted, a motor in one example). The hinge, which couples a rear end portion side of the seat cushion 16B with a lower end side of the seat back 16A, is also configured by including a shaft 30X extending in a seat width direction. The hinge supports the seat back 16A such that the seat back 16A can rotate around the shaft 30X in a prescribed range. The driving unit of the seat back reclining unit 30 rotates a region of the hinge on the side fixed to the seat back 16A.

The suction unit 32 (illustrated as a block in the drawing) is also referred to as a seat ventilation system (SVS). The suction unit 32 can suck air on the front side of the seat back 16A into the inside of the seat back 16A. The suction unit 32 includes, for example, a fan (illustration omitted) disposed inside the vehicular seat 16 (inside the seat back 16A in one example). The vehicular seat 16 has an outer skin through which air can flow, and a flow channel is formed between an inner surface side of the outer skin of the vehicular seat 16 and an area where the fan is disposed. Thus, when the fan is operated, air is sucked into the seat back 16A of the vehicular seat 16 from the front side of the seat back 16A.

The first detection unit 34 as a detection unit shown in FIG. 2 detects a change in state of a door 18 of the vehicle 10 that is an own vehicle shown in FIG. 1 from a closed state to an opened state. As the first detection unit 34 (see FIG. 2), a courtesy switch that is provided in the periphery of a door aperture provided for opening and closing of the door 18 may be applied. The first detection unit 34 shown in FIG. 2 outputs a signal in response to an opening-closing state of the door 18 (see FIG. 1) to the control unit 24.

The second detection unit 36 as a detection unit shown in FIG. 2 detects a change in state of a door lock 18A (illustrated as a block in the drawing) of the door 18 of the vehicle 10 that is the own vehicle shown in FIG. 1 from a locked state to an unlocked state. As the second detection unit 36 (see FIG. 2), a door lock detection switch may be applied as one example. When the user 70 having a smart key of the vehicle 10 approaches the vehicle 10 and unlocks the door lock 18A with the smart key, the second detection unit 36 (see FIG. 2) detects a change in state of the door lock 18A from the locked state to the unlocked state, before the user 70 reaches the vehicle 10. The second detection unit 36 shown in FIG. 2 outputs a signal in response to the state of the door lock 18A (see FIG. 1) to the control unit 24.

Figure 3:
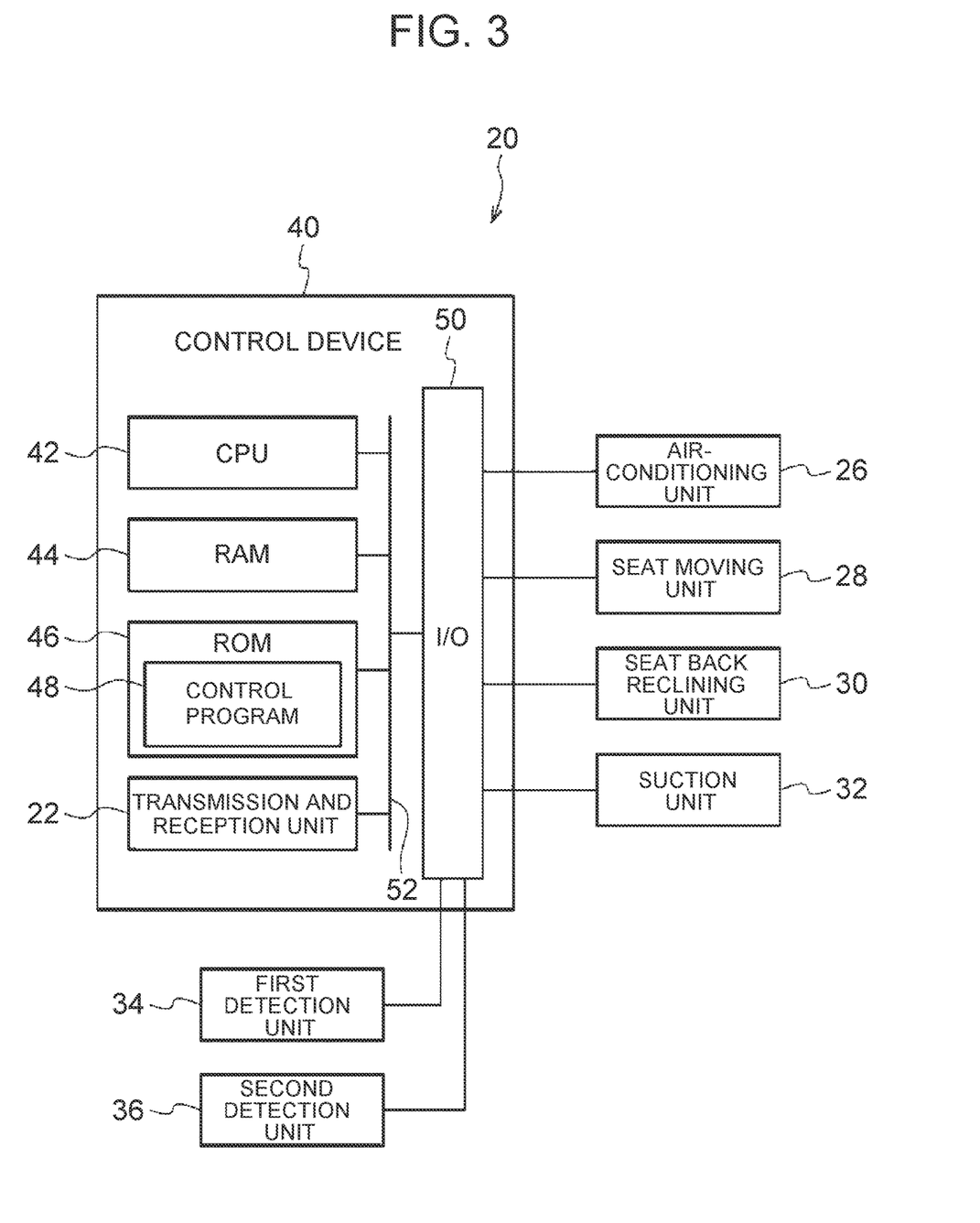
FIG. 3 is a block diagram showing the schematic configuration of a control unit and examples of component units connected to the control unit in the on-board device according to the embodiment.

The control unit 24 is included in the control device 40 as a computer. FIG. 3 shows the schematic configuration of the control device 40 according to the present embodiment and examples of component units connected to the control device 40. As shown in FIG. 3, the control device 40 includes a central processing unit (CPU: processor) 42, a random access memory (RAM) 44, a read only memory (ROM) 46, an input-output interface unit (input-output) 50, and a transmission and reception unit 22. These components are communicably connected to each other through a bus 52.

The CPU 42 executes various programs. Based on the programs, the CPU 42 performs control on each unit (device) connected to the control device 40, and various kinds of calculations. The ROM 46 is a nonvolatile storage unit which stores various programs, such as a control program 48 (one example of the control program of the on-board device according to the present disclosure), and various data. The RAM 44 temporarily stores various data, such as information on the position of the vehicular seat 16 (see FIG. 1) when an occupant most recently got out of the vehicle. The RAM 44 is also used as a work area of the programs. The input-output 50 performs communication with an external device. The input-output 50 is connected to the air-conditioning unit 26, the seat moving unit 28, the seat back reclining unit 30, the suction unit 32, the first detection unit 34, and the second detection unit 36. The control device 40 functions as the control unit 24 (see FIG. 2) when the control program 48 is read from the ROM 46 and expanded in the RAM 44, and the control program 48 expanded in the RAM 44 is executed by the CPU 42.

When remote control is performed for execution of pre-air conditioning, the control unit 24 shown in FIG. 2 controls the air-conditioning unit 26 such that the pre-air conditioning is executed, and controls the seat moving unit 28 such that the vehicular seat 16 (see FIG. 1) moves to the seat front side from a position 16X (see FIG. 1) at the time when the occupant most recently got out of the vehicle. When the remote control is performed for execution of the pre-air conditioning, the control unit 24 also controls the seat back reclining unit 30 such that the seat back 16A (see FIG. 1) reclines to the seat front side, and controls the suction unit 32 such that air on the front side of the seat back 16A is sucked into the inside of the seat back 16A. Furthermore, in the case where, after the remote control is performed for execution of the pre-air conditioning, the vehicular seat 16 (see FIG. 1) is positioned more on the seat front side than the position 16X (see FIG. 1) at the time when the occupant most recently got out of the vehicle, and the first detection unit 34 detects a change in state of the door 18 (see FIG. 1) of the vehicle 10 (see FIG. 1) from the closed state to the opened state or the second detection unit 36 detects a change in state of the door lock 18A (see FIG. 1) of the vehicle 10 from the locked state to the unlocked state, the control unit 24 controls the seat moving unit 28 such that the vehicular seat 16 moves, in the seat front-rear direction, to a position identical to the position 16X at the time when the occupant most recently got out of the vehicle.

Next, as function of the present embodiment, a control process executed by the CPU 42 (see FIG. 3) in the vehicle 10 mounted with the on-board device 20 shown in FIGS. 1 to 3 will be described with reference to a flowchart shown in FIG. 4. In one example, the control process shown in FIG. 4 starts to be executed when remote control for start-up of the engine (engine start request) is performed with the mobile device 60 or the like, and remote control for execution of the pre-air conditioning (operation request for pre-air conditioning) is performed with the mobile device 60. A surface temperature adjusting method of a vehicular seat is also executed upon execution of the control process described below.

Figure 4:
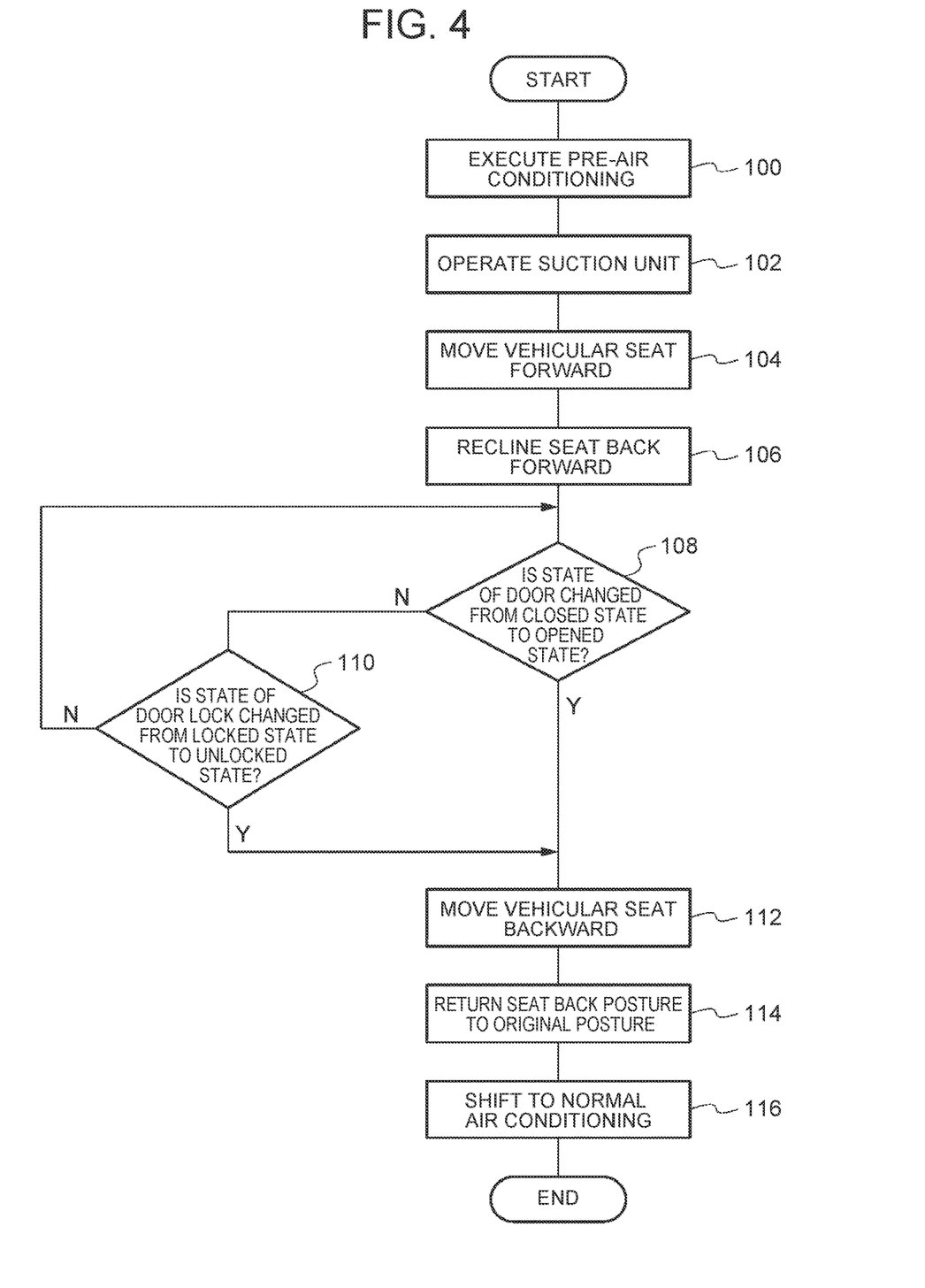
FIG. 4 is a flow chart showing one example of the processing flow of a control program according to the embodiment.
Figure 5A:
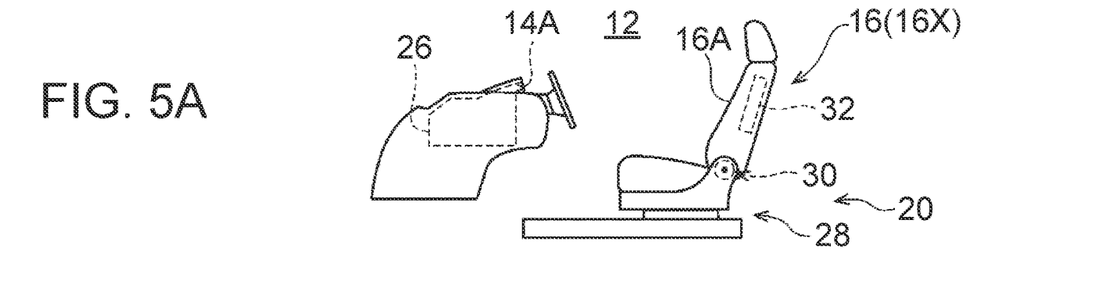
FIG. 5A shows the on-board device according to the embodiment in the state before an occupant gets into a vehicle and before pre-air conditioning is executed.
Figure 5B:
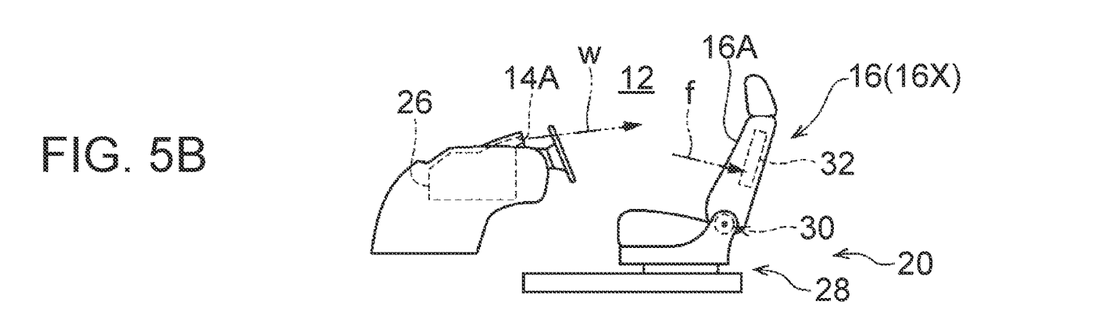
FIG. 5B shows the on-board device according the embodiment the state where steps 100, 102 of FIG. 4 are executed.

First, in step 100 of the control process shown in FIG. 4, the CPU 42 controls the air-conditioning unit 26 such that pre-air conditioning is executed based on a set temperature of the pre-air conditioning or the like. In step 102, the CPU 42 controls the suction unit 32 such that air on the front side of the seat back 16A (see FIG. 1) is sucked into the inside of the seat back 16A. Through the control, the air-conditioning unit 26 not it operation shown in FIG. 5A is operated as shown in FIG. 5B, where air-conditioning air (see arrow W) is blown into the vehicle cabin 12 from the air outlet port 14A, and the air-conditioning air is sucked into the inside of the seat back 16A (see arrow f). Therefore, the air-conditioning air is more efficiently applied to the front face of the seat back 16A. The pre-air conditioning may be cooling operation at hot time, or may be heating operation at cold time.

In step 104 shown in FIG. 4, the CPU 42 controls the seat moving unit 28 such that the vehicular seat 16 moves to the seat front side (see arrow M1 of FIG. 5C) from the position 16X at the time when the occupant most recently got out of the vehicle. In step 106, the CPU 42 controls the seat back reclining unit 30 such that the seat back 16A reclines to the seat front side. In the present embodiment, the CPU 42 executes step 106 in the state where the vehicular seat 16 is moved in step 104 in one example. In a modification of the present embodiment, the CPU 42 may control such that the vehicular seat 16 moves to and stops at a prescribed position in step 104, and then step 106 is executed. In the present embodiment, the vehicular seat 16 moves to a foremost position (front most) in a seat movable range in one example.

Figure 5C:
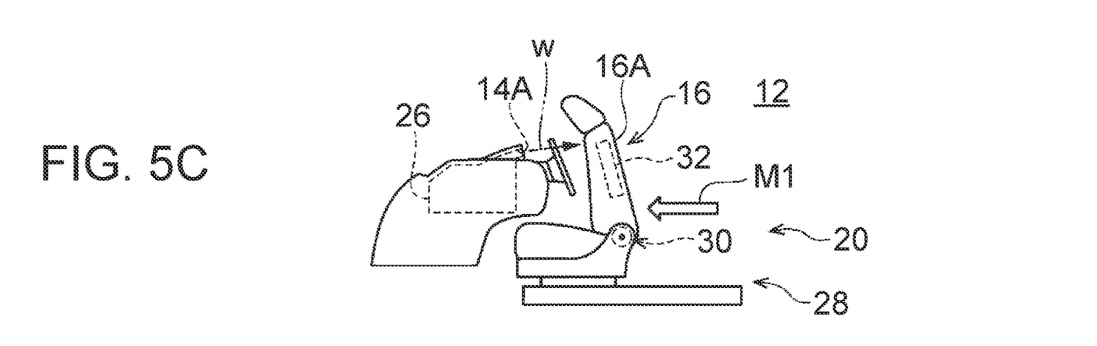
FIG. 5C shows the on-board device according to the embodiment it the state where steps 104, 106 of FIG. 4 are executed.

In a consequence, as shown in FIG. 5C, the seat back 16A approaches the air outlet port 14A, which achieves more effective application of the air-conditioning air to the front face of the seat back 16A. Some of the air-conditioning air which is applied to the front face of the seat back 16A may flow to a seat lower side along the front face of the seat back 16A. As a result, the surface temperature of the vehicular seat 16 at the time when the occupant sits on the seat can effectively be adjusted to be close to the temperature of the pre-air conditioning.

Next, in step 108 shown in FIG. 4, the CPU 42 determines whether or not the first detection, unit 34 detects a change in state of the door 18 of the vehicle 10 that is the own vehicle from the closed state to the opened state. When a positive determination is made in step 108, the process proceeds to step 112, whereas when a negative determination is made in step 108, the process proceeds to step 110. In step 110, the CPU 42 determines whether or not the second detection unit 36 detects a change in state of the door lock 18A of the vehicle 10 that is the own vehicle from the locked state to the unlocked state. When a positive determination is made in step 110, the process proceeds to step 112, whereas when a negative determination is made in step 110, the process returns to step 108.

Figure 5D:
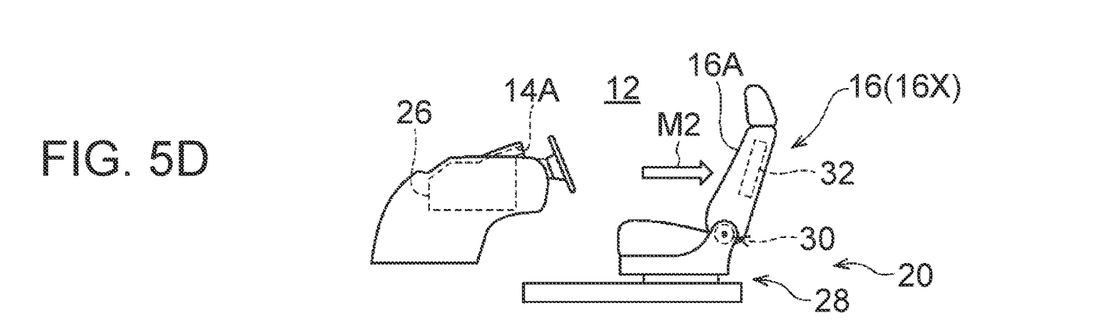
FIG. 5D shows the state where steps 112, 114 of FIG. 4 are executed.

In step 112, the CPU 42 controls the seat moving unit 28 such that the vehicular seat 16 moves, in the seat front-rear direction, to a position identical to the position 16X at the time when the occupant most recently got out of the vehicle (see arrow M2 in FIG. 5D). In step 114, the CPU 42 controls the seat back reclining unit 30 such that the seat back 16A returns to a reclined posture at the time when the occupant most recently got out of the vehicle. In the present embodiment, step 114 is executed in the state where the vehicular seat 16 is moved in step 112 in one example. In a modification of the present embodiment, the CPU 42 may control such that step 114 is executed after the vehicular seat 16 moves and stops in step 112. When steps 112, 114 are executed, the vehicular seat 16 returns, to the state when the occupant most recently got out of the vehicle as shown to FIG. 5D. Hence, the occupant can easily climb in the vehicle.

Then, after the air conditioning by the air-conditioning unit 26 shifts from the pre-air conditioning to normal air conditioning (air conditioning in the state where the occupant is in the vehicle) in step 116 shown in FIG. 4, the CPU 42 ends the control process shown in FIG. 4 (in other words, the CPU 42 ends the control program 48).

As described in the foregoing, in the present embodiment, the surface temperature of the vehicular seat 16 when an occupant sits on the seat can be adjusted to a comfortable temperature. As a result, the comfort of the occupant when the occupant is in the vehicle can be enhanced.

In the embodiment disclosed, the air outlet port 14A shown in FIG. 1 and other drawings is formed on the instrument panel 14, and the vehicular seat 16 equipped with the seat moving unit 28, the seat back reclining unit 30, and the suction unit 32, which are controlled by the control unit 24 (see FIG. 2), is a front seat. However, a modification of the embodiment may be configured such that the vehicle is an automobile mounted with three columns of seats, the air outlet port is formed on a back surface portion of the seat back of the front seat, and a vehicular seat equipped with the seat moving unit, the seat back reclining unit, and the suction unit 32 controlled by the control unit 24 is a second seat (seat in the second column).

In a modification of the embodiment, the suction unit 32 can suck air on the front side of the seat back 16A into the inside of the seat back 16A and into the inside of the seat cushion 16B. In this case, when remote control is performed for execution of pre-air conditioning, the control unit 24 may be configured to control the suction unit 32 such that the air on the front side of the seat back 16A is sucked into the inside of the seat back 16A and into the inside of the seat cushion 16B.

In the embodiment disclosed, the vehicle 10 is an engine vehicle in one example. However, the vehicle mounted with the on-board device of the present disclosure may be a hybrid vehicle or an electric vehicle. In the case where the vehicle mounted with the on-board device of the present disclosure mounts is a hybrid vehicle or an electric vehicle, the control process shown in FIG. 4 may start to be executed when remote control is performed for execution of pre-air conditioning (operation request of pre-air conditioning) with the mobile device 60.

In a modification of the embodiment, one of or both steps 102, 106 in the flowchart shown in FIG. 4 may be skipped. In the process flow, steps 102 to 106 may be executed in different sequences. In one example, the process flow may be performed such that steps are executed in order of steps 100, 104, 106, 102. In that case, steps 106, 102 may be executed in the state where the vehicular seat 16 is moved in step 104. Furthermore, one of or both steps 112, 114 may be skipped.

In a modification of the embodiment, the process flow may be configured such that step 110 shown in FIG. 4 is skipped, and when a negative determination is made in step 108, a change in state of the door 18 of the vehicle 10 from the closed state to the opened state is waited for (i.e., step 108 is repeated). In still another modification of the embodiment, the process flow may be configured such that step 108 shown in FIG. 4 is skipped, and step 110 is executed subsequent to step 106.

The control program 48 shown in FIG. 3 may be stored in a storage medium, or the like, to allow circulation of the control program 48.

In a modification of the embodiment, the surface temperature adjusting method of a vehicular seat may be a method including: pre-air conditioning that air-conditions the vehicle cabin 12 in advance by blowing air-conditioning air into the vehicle cabin 12 from the air outlet port 14A of air-conditioning unit 26; moving the vehicular seat 16 to the seat front side from the position 16X at the time when an occupant most recently got out of the vehicle; reclining the seat back 16A to the seat front side; and sucking air on the front side of the seat back 16A at least into the inside of the seat back 16A of the vehicular seat 16. These steps may be executed in response to different operation requests from different mobile devices 60. In the above modification of the embodiment, the control unit 24 may be configured to accept the operation requests for performing the steps of: moving the vehicular seat 16 to the seat front side from the position 16X at the time when an occupant most recently got out of the vehicle; reclining the seat back 16A to the seat front side; and sucking air on the front side of the seat back 16A at least into the inside of the seat back 16A of the vehicular seat 16, only when the control unit 24 has received an operation request for a pre-air conditioning. The vehicle 10 may be configured to receive a scheduled time for next boarding, and the control unit 24 may execute: pre-air conditioning in conformity with the received boarding time; moving the vehicular seat 16 from the position 16X at the time when the occupant most recently got out of the vehicle to the seat front side; reclining the seat back 16A to the seat front side; and sucking air on the front side of the seat back 16A at least into the inside of the seat back 16A of the vehicular seat 16.

The embodiment and the modifications may be executed in, appropriate combinations.

Although examples of the present disclosure have been described in the foregoing, the present disclosure is not limited to the examples. It is naturally understood that various modifications are possible without departing from the scope of the disclosure.

What is claimed is:

1. An on-board device, comprising:
   an air-conditioning unit configured to perform air conditioning by blowing air-conditioning air into a vehicle cabin from an air outlet port that faces the vehicle cabin, and perform, in accordance with a pre-air conditioning instruction signal, pre-air conditioning for air-conditioning the vehicle cabin before an occupant gets into a vehicle;
   a seat moving unit configured to move a vehicular seat in a seat front-rear direction, the vehicular seat being disposed such that a front face of a seat back faces the air outlet port;
   a control unit configured to, in response to receiving the pre-air conditioning instruction signal, control the air-conditioning unit such that the pre-air conditioning is performed, and control the seat moving unit such that the vehicular seat moves to a seat front side, whereby the front face of the seat back is moved closer to the air outlet port as compared to a reclined posture the vehicular seat is later returned to so the occupant can enter the vehicle;
   a detection unit configured to detect at least one of a change in state of a door of the vehicle from a closed state to an opened state and a change in state of a door lock of the vehicle from a locked state to an unlocked state; and
   after the pre-air conditioning instruction signal is received, the vehicular seat has been moved to the seat front side, and the detection unit detects at least one of the change in state of the door of the vehicle from the closed state to the opened state and the change in state of the door lock of the vehicle from the locked state to the unlocked state, the control unit is configured to control the seat moving unit such that the vehicular seat moves to a position at which the vehicular seat was positioned before the control unit controls the seat moving unit such that the vehicular seat moves to the seat front side in response to receiving the pre-air conditioning instruction signal.

2. The on-board device according to claim 1, further comprising
a seat back reclining unit configured to move the seat back in the seat front-rear direction, wherein
the control unit is configured to control, in response to receiving the pre-air conditioning instruction signal, the seat back reclining unit such that the seat back is moved to the seat front side.

3. The on-board device according to claim 1, further comprising
a suction unit configured to suck air on a front side of the seat back at least into an inside of the seat back of the vehicular seat, wherein
the control unit is configured to control, in response to receiving the pre-air conditioning instruction signal, the suction unit such that the air on the front side of the seat back is sucked at least into the inside of the seat back of the vehicular seat.

4. The on-board device according to claim 1, further comprising
a seat back reclining unit configured to move the seat back in the seat front-rear direction, wherein
the control unit is configured to control the seat back reclining unit such that the seat back is moved to the seat front side in accordance with a second pre-air conditioning instruction signal different from the pre-air conditioning instruction signal for performing the pre-air conditioning.

5. The on-board device according to claim 1, further comprising
a suction unit configured to suck air on the front side of the seat back at least into an inside of the seat back, wherein,
the control unit is configured to control the suction unit such that the air on the front side of the seat back is sucked at least into the inside of the seat back of the vehicular seat based on a second pre-air conditioning instruction signal different from the pre-air conditioning instruction signal for performing the pre-air conditioning.

6. The on-board device according to claim 1, wherein
the control unit is configured to, in response to receiving the pre-air conditioning instruction signal, control the seat moving unit such that the vehicular seat moves to the seat front side from a position at a time when an occupant most recently got out of the vehicle.

7. A control method of an on-board device, wherein the on-board device includes an air-conditioning unit configured to perform air conditioning by blowing air-conditioning air into a vehicle cabin from an air outlet port that faces the vehicle cabin, and perform, in accordance with a pre-air conditioning instruction signal, pre-air conditioning for air-conditioning the vehicle cabin in advance by remote control before an occupant gets into a vehicle, and a seat moving unit configured to move a vehicular seat in a seat front-rear direction, the vehicular seat being disposed such that a front face of a seat back faces the air outlet port,
the control method comprising:
controlling the air-conditioning unit such that the pre-air conditioning is performed, in response to receiving the pre-air conditioning instruction signal;
controlling the seat moving unit such that the vehicular seat moves to a seat front side, in response to receiving the pre-air conditioning instruction signal, whereby the front face of the seat back is moved closer to the air outlet port as compared to a reclined posture the vehicular seat is later returned to so the occupant can enter the vehicle;
detecting at least one of a change in state of a door of the vehicle from a closed state to an opened state and a change in state of a door lock of the vehicle from a locked state to an unlocked state; and
after the pre-air conditioning instruction signal is received, the vehicular seat has been moved to the seat front side, and the at least one of the change in state of the door of the vehicle from the closed state to the opened state and the change in state of the door lock of the vehicle from the locked state to the unlocked state is detected, controlling the seat moving unit such that the vehicular seat moves to a position at which the vehicular seat was positioned before the control unit controls the seat moving unit such that the vehicular seat moves to the seat front side in response to receiving the pre-air conditioning instruction signal.

8. A non-transitory storage medium storing a program, wherein when executed by a computer that is included in an on-board device including: an air-conditioning unit configured to perform air conditioning by blowing air-conditioning air into a vehicle cabin from an air outlet port that faces the vehicle cabin, and perform, in accordance with a pre-air conditioning instruction signal, pre-air conditioning for air-conditioning the vehicle cabin before an occupant gets into a vehicle; a seat moving unit to move a vehicular seat in a seat front-rear direction, the vehicular seat being disposed such that a front face of a seat back faces the air outlet port; and a detection unit to detect at least one of a change in state of a door of the vehicle from a closed state to an opened state and a change in state of a door lock of the vehicle from a locked state to an unlocked state,
the program causes, in response to receiving the pre-air conditioning instruction signal, the computer to execute a process including controlling the air-conditioning unit such that the pre-air conditioning is performed, and controlling the seat moving unit such that the vehicular seat moves to a seat front side, whereby the front face of the seat back is moved closer to the air outlet port as compared to a reclined posture the vehicular seat is later returned to so the occupant can enter the vehicle; and
the program causes, after the pre-air conditioning instruction signal is received, the vehicular seat has been moved to the seat front side, and the detection unit detects at least one of the change in state of the door of the vehicle from the closed state to the opened state and the change in state of the door lock of the vehicle from the locked state to the unlocked state, the computer to execute a process including controlling the seat moving unit such that the vehicular seat moves to a position at which the vehicular seat was positioned before the control unit controls the seat moving unit such that the vehicular seat moves to the seat front side in response to receiving the pre-air conditioning instruction signal.

9. A surface temperature adjusting method of a vehicular seat, wherein the surface temperature adjusting method is applied to a vehicle including an air-conditioning unit including an air outlet port facing a vehicle cabin, and the vehicular seat disposed such that a front face of a seat back faces the air outlet port, the surface temperature adjusting method comprising:
> before an occupant gets into the vehicle, in response to receiving a pre-air conditioning instruction signal, performing pre-air conditioning for air-conditioning the vehicle cabin by blowing air-conditioning air into the vehicle cabin from the air outlet port of the air-conditioning unit, and moving the vehicular seat to a seat front side, whereby the front face of the seat back is moved closer to the air outlet port as compared to a reclined posture the vehicular seat is later returned to so the occupant can enter the vehicle; and
>
> after the pre-air conditioning instruction signal is received, the vehicular seat has been moved to the seat front side, and at least one of a change in state of a door of the vehicle from a closed state to a opened state and a change in state of a door lock of the vehicle from a locked state to an unlocked state is detected, moving the vehicular seat to a position at which the vehicular seat was positioned before moving the vehicular seat to the seat front side in response to receiving the pre-air conditioning instruction signal.

10. The surface temperature adjusting method according to claim 9, further comprising
> reclining the seat back to the seat front side before the occupant gets into the vehicle.

11. The surface temperature adjusting method according to claim 9, further comprising
> sucking air on the front side of the seat back at least into an inside of the seat back of the vehicular seat before the occupant gets into the vehicle.

\* \* \* \* \*